United States Patent [19]

Glatthorn

[11] 4,242,563
[45] Dec. 30, 1980

[54] AUTOMATIC PLUG WELDING APPARATUS

[75] Inventor: Raymond H. Glatthorn, St. Petersburg, Fla.

[73] Assignee: Westinghouse Electric Corp., Pittsburgh, Pa.

[21] Appl. No.: 917,837

[22] Filed: Jun. 22, 1978

[51] Int. Cl.³ .............................................. B23K 9/12
[52] U.S. Cl. ............................ 219/125.11; 219/60 A; 219/160; 219/137 R
[58] Field of Search ............. 219/137 R, 60.2, 125.11, 219/160, 60 A, 136

[56] References Cited

U.S. PATENT DOCUMENTS

| 2,930,883 | 3/1960 | Adamel | 219/125.11 |
|---|---|---|---|
| 2,962,306 | 11/1960 | Hawthorne | 219/137 R X |
| 3,118,052 | 1/1964 | Lippart | 219/137 R |
| 3,188,446 | 6/1965 | Ray | 219/137 R |
| 3,513,286 | 5/1970 | Pols | 219/60.2 |
| 3,643,059 | 2/1972 | Hill | 219/60.2 |
| 3,699,297 | 10/1972 | Grin | 219/160 X |
| 4,103,140 | 7/1978 | Glatthorn | 219/60 A |

*Primary Examiner*—E. A. Goldberg
*Attorney, Agent, or Firm*—F. J. Baehr, Jr.

[57] ABSTRACT

Apparatus for automatically welding a plug which is previously driven into holding engagement with the tube sheet to plug a leaky tube which has been reamed out to produce a pressed fit with the plug.

3 Claims, 6 Drawing Figures

AUTOMATIC PLUG WELDING APPARATUS

BACKGROUND OF THE INVENTION

1. Field of the Invention

This invention relates to automatic welding equipment and more particularly to welders for seal welding a plug in a tube of the steam generator in a nuclear power plant.

The plugs are placed in leaky tubes in the primary side of the steam generator which has sufficiently high levels of radioactivity to limit the time a workman is allowed therein. One particular important consideration in performing work in a radioactive environment is a wise use of manpower. The objective being to obtain the most effective use of manpower in order to expose each workman to a minimum amount of radiation. This is especially important when the workman is a skilled craftman such as a qualified welder. In cases where the radioactive level has been high, the process of welding one plug in a tubesheet exposed the qualified welder to his allotted quantum of radiation. The apparatus described hereinafter allows a qualified welder to set the proper parameters on the welding torch and plug outside of the radioactive environment. The plug and spindle are removed from the apparatus, allowing an unskilled laborer having a minimum amount of training to enter the radioactive environment, drive the plug into the proper tube and quickly attach the apparatus thereto. The qualified welder can then remotely perform the seal weld. The apparatus described herein not only reduces the time in which a workman is exposed to radiation for each weld, but also practically eliminates all exposure to the skilled qualified welder and thereby greatly increases his availability and productivity. And it also allows the use of unskilled laborers with a minimum amount of training to set up the welding procedure greatly increasing the number of available workmen, each of which may be safely subjected to an allowed quantum of radioactivity.

2. Description of the Prior Art

U.S. Pat. No. 4,103,140 issued in the name of this inventor and a continuation of the Patent Application filed Mar. 8, 1977 in the name of this inventor and assigned Ser. Nos. 775,675 and 775,676 when originally filed and Ser. No. 908,046 when refiled Apr. 18, 1979 show apparatus which is installed in the head of a steam generator to remotely position a tool so that it can operate on tube ends within a portion of the head. The tool is remotely operated driving a plug into a leaky hole and seal welding it into the tube. These tools find application where there are a large number of tubes to be plugged as the time required to set up the tool inside the head of the steam generator is great.

U.S. Pat. No. 4,004,125 sets forth a multi-head welding gun for seal welding tubes to a tubesheet, but does not show a detachable spindle which can be affixed to the plug.

SUMMARY OF THE INVENTION

In general, apparatus for welding a tapered plug driven into holding engagement with the end of a tube, when made in accordance with this invention, comprises a spindle which is axially aligned with the plug, an arrangement for retaining the spindle within the plug, a drive and torch combination for producing a weld circumscribing the juncture of the end of the tube and the plug, and an arrangement for quickly releasing the apparatus from the plug whereby the apparatus may be quickly moved to another tapered plug driven into holding engagement with the end of another tube.

BRIEF DESCRIPTION OF THE DRAWINGS

The objects and advantages of this invention will become more apparent from reading the following detail description in connection with the accompanying drawings, in which.

DESCRIPTION OF THE PREFERRED EMBODIMENTS

Figure 1:
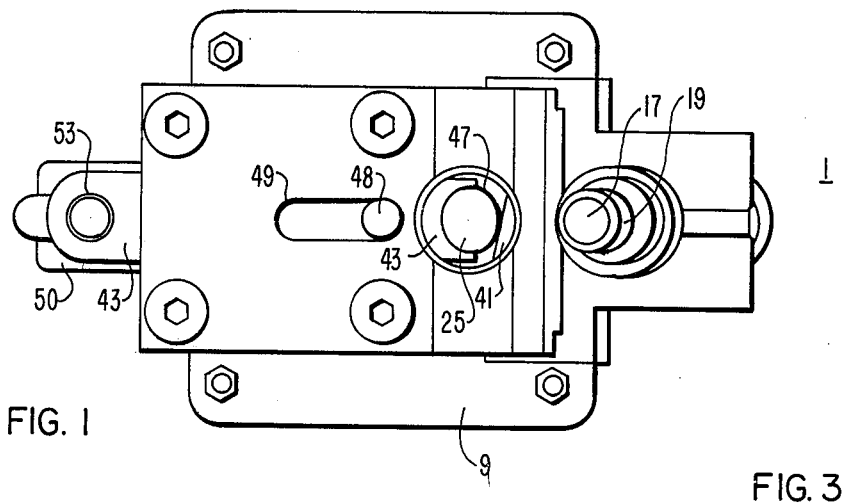
FIG. 1 is a plan view of apparatus for automatically seal welding a plug to a tube.
Figure 2:
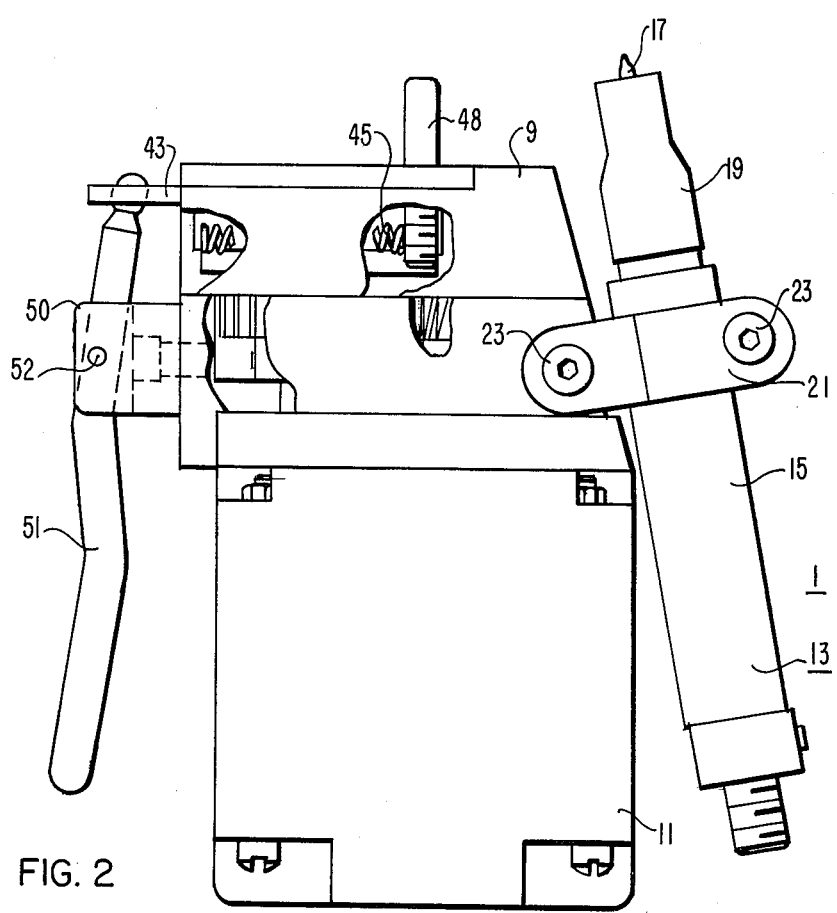
FIG. 2 is an elevational view of the apparatus partly in section.
Figure 5:
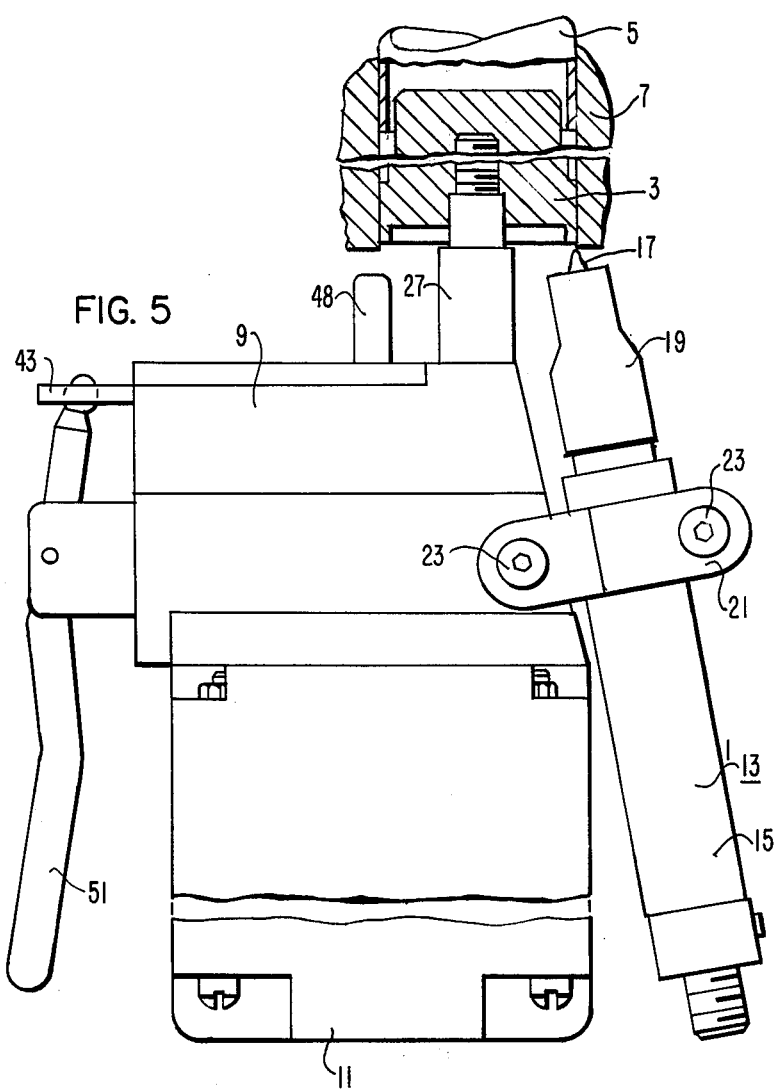
FIG. 5 is an elevational view showing the apparatus and a plug disposed in a tube.

Referring now to the drawings in detail and in particular to FIGS. 1, 2 and 5 there is shown apparatus 1 for automatically seal welding a plug 3 in a leaky tube 5 disposed in a hole 6 in a tube sheet 7.

The apparatus 1 comprises a base 9, an electrical motor 11 depending from the base 9, and a welding torch 13 pivotally connected to the base 9. The torch 13 has a body 15, a tungsten electrode 17 and a ceramic cup 19 encircling the electrode 17 to form a nozzle that directs inert gas supplied thereto to blanket the weld puddle formed when electric current is applied to the tungsten electrode 17. A mounting bracket 21 is pivotally mounted on the base 9 so that it can be affixed at any desired angular position and the torch body 15 is slidably disposed in the bracket 21 in such a manner that it may be fixed at any slidable position therein. Socket head cap screws 23 or other fastening means are utilized to affix the bracket 21 and body 15 of the torch 13 relative to the apparatus 1.

The base 9 and motor 11 have registering openings 25 adapted to receive a spindle 27.

Figure 3:
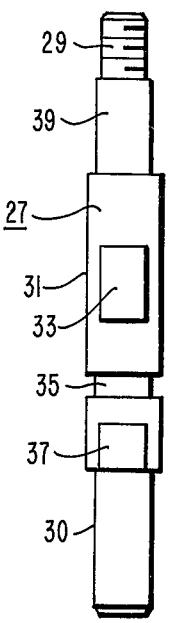
FIG. 3 is an elevational view of a spindle for the apparatus.

The spindle 27, as shown best in FIG. 3, is a round rod having a male thread 29 disposed on one end thereof. The other end 30 is turned down to fit into the opening 25 in the motor 11. A central portion 31 of the spindle 27 containing its major diameter has opposing flats 33 which will accept a wrench (not shown). A circumferential groove 35 is disposed adjacent the turned-down end 30 and flats 37 are machined in the central portion 31 contiguous with the turned-down end 30. The spindle 27 also has a turned-down portion 39 disposed between the male thread 29 and the central portion 31.

The opening 25 in the base 9 has a lug 41 which engages the flat 37 on the spindle 27 affixing the rotor of the motor 11 to the spindle 27. A slide plate 43 is slidably disposed in the base 9 and biased toward the opening 25 by a spring 45. The end 47 of the slide plate 43 extends into the opening 25 and is moon-shaped. The moon-shaped end 47 engages the circumferential groove 35 on the spindle 27 to lock the spindle 27 in the apparatus 1 with the flat 37 engaging the lug 41. A pin 48 is disposed in the slide plate 43 and a slot 49 is disposed in the base 9 limiting the travel of the slide plate 43 and providing a surface upon which the spring 45 reacts to bias the slide plate 43 toward the opening 25.

The base 9 has a pair of ears 50 disposed on one side thereof. A lever 51 is pivotally mounted in the ears 50 by a pin 52 and is slidably connected to a hole 53 disposed in the slide plate 43 in such a manner that when the lever 51 is depressed the slide plate 43 is moved away from the spindle 27 and opening 25 unlocking the spindle 27 so that it may be easily removed from the apparatus 1.

Figure 4:
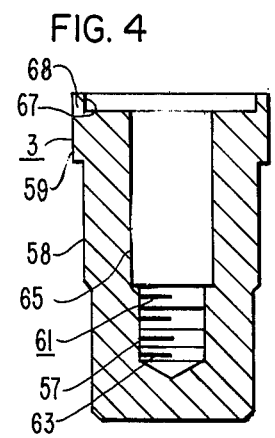
FIG. 4 is an elevational view partially in section of a plug utilized with the apparatus.

As shown best in FIG. 4 the plug 3 is generally cylindrical with steps 57, 58 and 59 which ascend outwardly from the leading end. The plug 3 has a drilled hole 61 extending inwardly from the trailing end. The bottom end of the hole 61 has threads 63. The hole 61 also has two counterbores, one counterbore 65 is adjacent the threaded portion 63 and is slightly larger in diameter than the major diameter of the threaded portion 63, the other counterbore portion 67 is adjacent the trailing end forming a thin wall 68 adjacent the trailing end of the plug 3 for welding the plug 3 to the tubesheet 7. The tube 5 is drilled out and the hole 6 in the tubesheet 7 is reamed to produce a pressed fit with the plug 3.

The operation of the apparatus 1 is as follows. The spindle 27 is inserted into the opening 25 in the apparatus 1. The lever 51 is depressed, allowing the lug 41 to engage the flat 37. The lever 51 is then released, allowing the moon-shaped end 47 of the slide plate 43 to engage the circumferential groove 35 to lock the spindle 27 in the apparatus 1. The plug 3 is screwed onto the spindle 27, this may be done prior to or after the spindle 27 is inserted in the opening 25. However, the plug must be tightened so that it is seated on the spindle to affix it relative thereto. With the spindle 27 and plug 3 in place the position of the torch 13 is adjusted by a qualified welder who sets the position of the torch 13 relative to the outer edge 46 of the plug 3 by loosening the cap screws 23 to move the torch 13 and/or the mounting bracket 21 as required to properly align the torch 13 and once aligned, the cap screws 23 are tightened, locking the torch 13 and bracket 21 in position in order to produce a good weld when the plug 3 is inserted in the reamed hole. The lever 51 is again depressed moving the slide plate 43 in its moon-shaped end 47 out of engagement with the circumferential groove 35 releasing the spindle 27, which may then be removed from the apparatus together with the plug 3. An unskilled laborer takes the plug 3 with spindle 27 attached and inserts them into the tube hole to be plugged and drives the plugs. The plug 3 is driven into the tube hole where it is held by a forced fit and the unskilled laborer then depresses the lever 51 on the apparatus and places the apparatus on the spindle, releasing the lever 51 locks the apparatus 1 on the spindle 27. The qualified welder then can remotely operate the apparatus to weld the plug 3 to the tube 5. When the weld is complete the unskilled laborer removes the apparatus from the spindle by depressing the lever 51 and unscrews the spindle 27 from the plug 3, utilizing a wrench on the flats 33. This operation is repeated until all of the leaky tubes 5 are plugged. Since the qualified welder can set up the plug 3, spindle 27 and apparatus 1 to produce a good weld outside of the radioactive environment, he is not exposed to the radioactivity inside the vessel. As unskilled laborers are subjected to their allowable quantums of radioactivity they are replaced by other unskilled laborers who need only be given a minimum amount of training to perform the operations, which must take place in the radioactive vessel.

Figure 6:
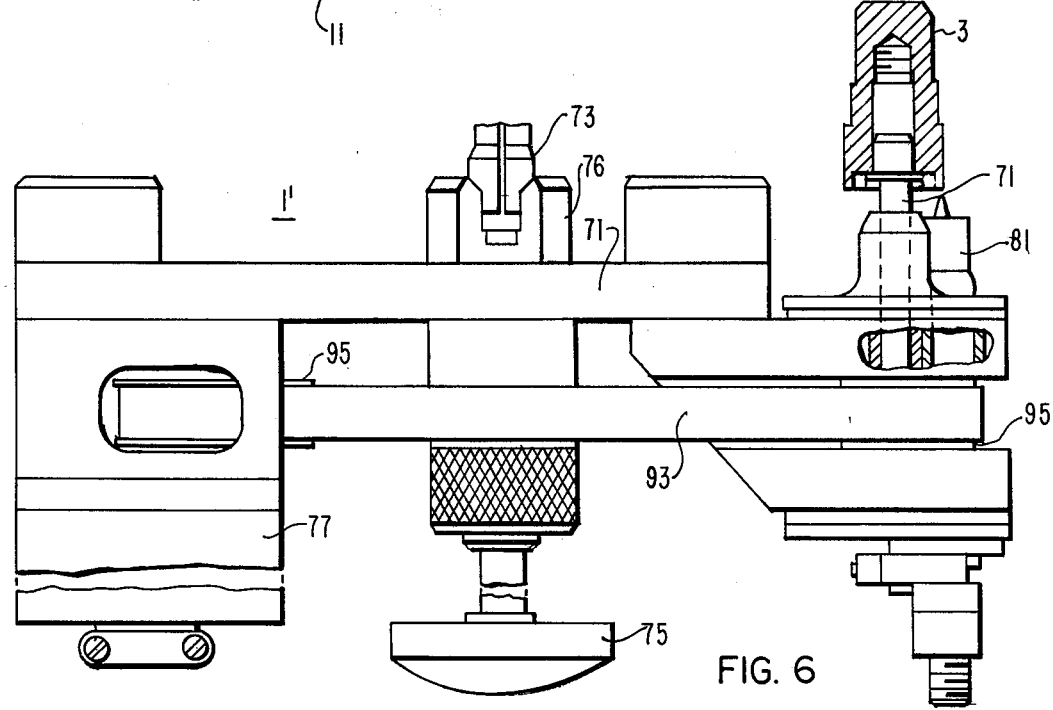
FIG. 6 is an elevational view of alternate apparatus for seal welding a plug to a tube.

FIG. 6 shows an alternate apparatus 1' for welding a plug 3 into a tube 5. The apparatus 1' comprises a baseplate 71, a mandrel 73 which fits into a tube and is expanded into holding engagement with the tube by turning the handle 75. The baseplate 71 is positioned adjacent the ends of the tubes by a stop 76 cooperatively associated with the mandrel 73. A motor 77 is disposed on one side of the baseplate 71 and a spindle 79 and torch 81 are disposed from the other side of the baseplate 71. The spindle 79 has a shoulder 83 disposed thereon which contacts the plug 3 affixing the plug 3 with respect to the spindle 79. The torch 81 is adjustable radially and axially with respect to the spindle 79 so that a welder can set the proper position of the torch 81 to produce a good weld between the plug 3 and the tube 5. The spindle 79 and torch 81 act as a unit and are biased toward the tubesheet so that any time the spindle is moved the torch moves a like distance with respect to the tubesheet.

A belt and sheaves 93 and 95 form a drive which transmit rotating motion from the motor to the torch 81.

The operation of the apparatus 1' as shown in FIG. 6 is as follows: a plug 3 is set on the spindle 79 so that it rests against the shoulder 83, the torch 81 is adjusted by a qualified welder outside of the vessel and away from the radioactive environment. The welder sets the torch relative to the plug so as to form a good weld. The plug is removed from the spindle and an unskilled laborer takes the plug and the apparatus into the radioactive environment or vessel and drives the plug into the prepared tube hole adjacent the driving plate or channel head in such a manner that the plug 3 holds itself in the tube 5. The expandable mandrel 73 is inserted into a nearby tube 5 and the spindle 79 is inserted into the plug 4. The apparatus 1' is pushed toward the tubesheet until the spacer 76 contacts the tubesheet. The spindle 79 is held into the plug by a spring which biases the spindle 79 and torch 81 toward the tubesheet allowing for variations in the location of the plug 3 with respect to the tubesheet. The handle 75 is turned holding the apparatus 1' against the tubesheet with the torch 81 and spindle 79 at their proper location with respect to the plug 3 to form a good weld. The welder then energizes the torch 83 and motor 77, producing a seal weld between the plug 3 and the tubesheet. The handle 75 is turned unlocking the apparatus 1' which can then be removed and also brought out of the radioactive environment so that the qualified welder can set up another plug and continue the operation as described hereinbefore.

The apparatus described hereinbefore advantageously permits the use of unskilled labor to enter the radioactive environment and with a minimum amount of training perform the necessary task to produce a good weld while the skilled qualified welder performs all his tasks outside the radioactive environment so as not to require a large number of qualified welders when there are a large number of tubes to be plugged.

What is claimed is:

1. Welding apparatus for welding a tapered plug, which can be driven into holding engagement with a cylindrical opening, to the juncture of said opening and plug, said apparatus comprising a spindle detachably connectable and axially alignable with a plug; drive means detachably connected to said spindle in such a manner that the drive means rotates itself about said spindle; said spindle having a circumferential groove and said drive means having a plate slidably disposed therein and biased to engage the groove in the spindle to retain the spindle in the drive means and having means for sliding the plate out of engagement with the groove so that the drive means can be removed from the spindle; and welding means attached to said drive means for producing a weld circumscribing the juncture of said plug and said cylindrical opening.

2. Welding apparatus as set forth in claim 1, wherein the spindle has disposed thereon a drive portion, which cooperates with the drive means to allow the drive means to rotate itself about the spindle.

3. Welding apparatus as set forth in claim 2, wherein the spindle has a pair of opposed flats, which will accept a wrench and the plug has a knurled portion so that the plug can be securely fastened to the spindle.

* * * * *